R. T. Smith.
Universal Joint.
No. 66052. Patented June 25, 1867.
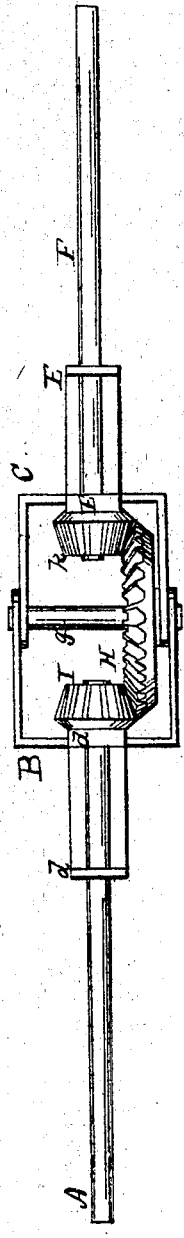
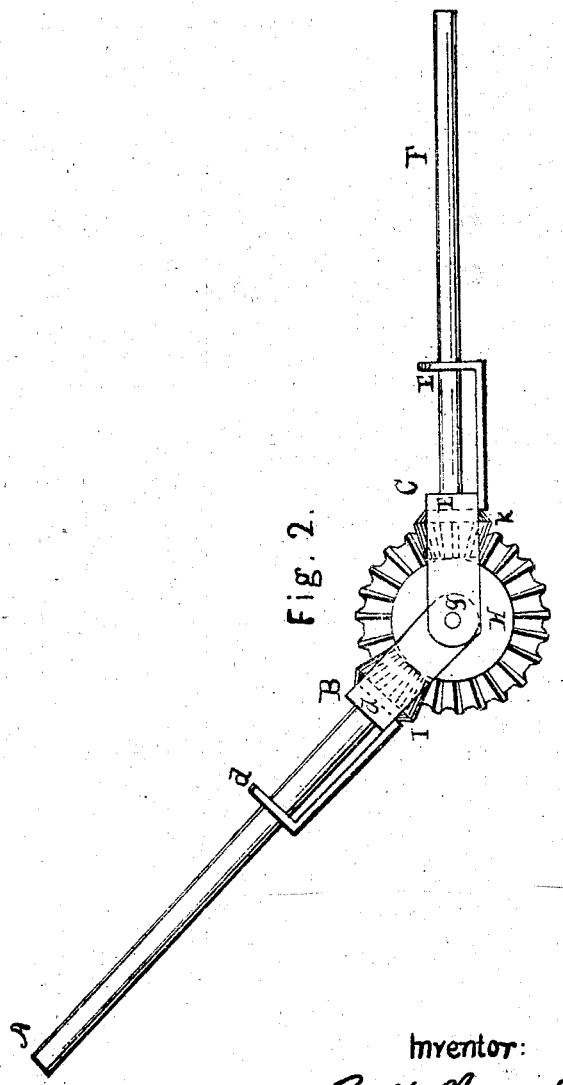
Witnesses:
G. F. Allen
S. I. Alvord.
Inventor:
R. T. Smith

United States Patent Office.

R. T. SMITH, OF NASHUA, NEW HAMPSHIRE.

Letters Patent No. 66,052, dated June 25, 1867.

IMPROVEMENT IN UNIVERSAL JOINT.

The Schedule referred to in these Letters Patent and making part of the same.

TO ALL WHOM IT MAY CONCERN:

Be it known that I, R. T. SMITH, of Nashua, in the county of Hillsboro, and State of New Hampshire, ha invented a new and improved Universal Joint; and I do hereby declare that the following is a full and exa description thereof, reference being had to the accompanying drawings, and to the letters of reference mark thereon.

Figure 1 represents a horizontal view.
Figure 2 represents a side view.
Similar letters of reference indicate like parts.

The device relates to a new and improved universal joint by which power may be transmitted in an obliq direction without serious detriment to the force of the power.

A is a shaft passing through the bearings $d\ d$, in which it turns, revolving the cog-wheel I, the intermedia cog-wheel H, the cog-wheel $k$, and the shaft F in the bearings E E. B and C are stirrups, with their bearings $c$ and E E connected by and turning freely on the shaft $g$, which shaft supports the cog-wheel H. By referer to fig. 2 it will be seen that either of the shafts, A or F, can be brought to the points L, M, or N, or any int mediate points, without seriously diminishing the force or speed.

I would remark that by placing two pulleys or one pulley on which two belts can run on shaft $g$, the sha A and F swivelling in bearings $d\ d$ and E E, or by placing on shaft $g$ the cog-wheel H and a pulley, one sh revolving its small cog-wheel and the cog-wheel H, and the other swivelling in the bearings $d\ d$ or E E, acting a support to keep the pulley in place for running a belt, essentially the same device may be obtained.

I claim the combination of stirrups B and C with their bearings $d\ d$ and E E swinging on the intermedia shaft $g$, on which shaft an intermediate cog-wheel or cog-wheel and pulley, or two pulleys, may be placed, esse tially as represented in the accompanying drawings.

R. T. SMITH.

Witnesses:
G. F. ALLEN,
S. I. ALVORD.